(12) United States Patent
Smith

(10) Patent No.: US 6,344,938 B1
(45) Date of Patent: Feb. 5, 2002

(54) METHOD AND APPARATUS FOR PREEMPTIVE HEAD CRASH AVOIDANCE IN A DISK DRIVE

(75) Inventor: Gordon James Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/535,108

(22) Filed: Mar. 24, 2000

(51) Int. Cl.⁷ .................................................. G11B 5/02
(52) U.S. Cl. ........................... 360/25; 360/31; 360/75; 360/47; 360/60
(58) Field of Search .............................. 360/25, 31, 75, 360/53, 47, 60; 324/212, 226; 714/6, 769, 770; 711/111, 112, 114; 369/53.1, 53.42, 53.45

(56) References Cited

U.S. PATENT DOCUMENTS 5,410,439 A * 4/1995 Egbert et al. ................. 360/75
5,870,241 A * 2/1999 Ottesen et al. ................ 360/53
6,249,393 B1 * 6/2001 Billings et al. ............... 360/60

\* cited by examiner

*Primary Examiner*—Alan T. Faber
(74) *Attorney, Agent, or Firm*—Joan Pennington

(57) ABSTRACT

A method and apparatus are provided for preemptive head crash avoidance in a direct access storage device (DASD). At least two actuators are provided in the DASD. Each actuator services at least one transducer head. Monitoring for a predicted head crash is performed. Responsive to an identified predicted head crash, a transducer head for the predicted head crash is unloaded and unloading each additional transducer head being serviced by an actuator for the transducer head for the predicted head crash. A data backup process is performed. Responsive to an identified predicted head crash, data are transferred from a disk surface associated with the transducer head for the predicted head crash and transferring data from each disk surface associated with each additional transducer head being serviced by the actuator for the transducer head for the predicted head crash.

13 Claims, 5 Drawing Sheets

METHOD AND APPARATUS FOR PREEMPTIVE HEAD CRASH AVOIDANCE IN A DISK DRIVE

FIELD OF THE INVENTION

The present invention relates generally to the data processing field, and more particularly, relates to a method and apparatus for preemptive head crash avoidance in a direct access storage device (DASD).

DESCRIPTION OF THE RELATED ART

Computers often include auxiliary memory storage units having media on which data can be written and from which data can be read for later use. Disk drive units incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the drive axis write data to the disks and read data from the disks.

Data located on a particular track on a disk surface is read or written by properly positioning a data transducer head directly over the track. In order to maintain the head in proper position over the data track, track-following servo systems often are incorporated into disk drives. Servo position control is used to position the data heads in registration with the data information tracks. A sector servo system uses the data heads as servo transducers in a time multiplexed fashion. As a head is following a particular track on a rotating disk, the head will pick up data information and servo information alternately. Servo information, interlaced with data information, is prewritten on the disk surfaces at manufacturing time within narrow radial sectors as spokes on a wagon wheel. A servo system that interlaces data and servo information is commonly referred to as sector servo or embedded servo. Another servo system uses a dedicated servo transducer head to read position signals recorded in servo information tracks on a dedicated disk surface. The data heads are ganged with the servo head for simultaneous movement relative to the data information tracks and the servo information tracks. To access the disk drive unit, a feedback sector servo controlled drive system locates the head in a desired position, where data is to be written or read.

A head crash often renders a conventional disk drive inoperable. One of the reasons for magnetic recording heads crashing of a disk surface, for example, causing catastrophic failure is the presence of protruding disk defects or asperities. The manufacturing glide test screens disk drives for unacceptable disk asperities in order to reduce the probability of a crash. Some of the disk defects also, are grown during the life of the drive. These defects include ding marks, pits, gouges, protruding disk defects or thermal asperities. Large surface bumps are notorious for causing physical head-to-disk contact, which is the precursor for a fatal disk crash. All users of hard disk drives dread even the thought of a fatal disk crash, since all data stored on that unfortunate disk drive may be lost forever.

A need exists for a method and apparatus for preemptive head crash avoidance in a direct access storage device (DASD).

SUMMARY OF THE INVENTION

A principal object of the present invention is to provide a method and apparatus for preemptive head crash avoidance in a direct access storage device (DASD). Other important objects of the present invention are to provide such method and apparatus for preemptive head crash avoidance in a direct access storage device (DASD) substantially without negative effect; and that overcome many of the disadvantages of prior art arrangements.

In brief, a method and apparatus are provided for preemptive head crash avoidance in a direct access storage device (DASD). At least two actuators are provided in the DASD. Each actuator services at least one transducer head. Monitoring for a predicted head crash is performed. Responsive to an identified predicted head crash, a transducer head for the predicted head crash is unloaded and unloading each additional transducer head being serviced by an actuator for the transducer head for the predicted head crash.

In accordance with features of the invention, a data backup process is performed. Responsive to an identified predicted head crash, data are transferred from a disk surface associated with the transducer head for the predicted head crash and transferring data from each disk surface associated with each additional transducer head being serviced by the actuator for the transducer head for the predicted head crash.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
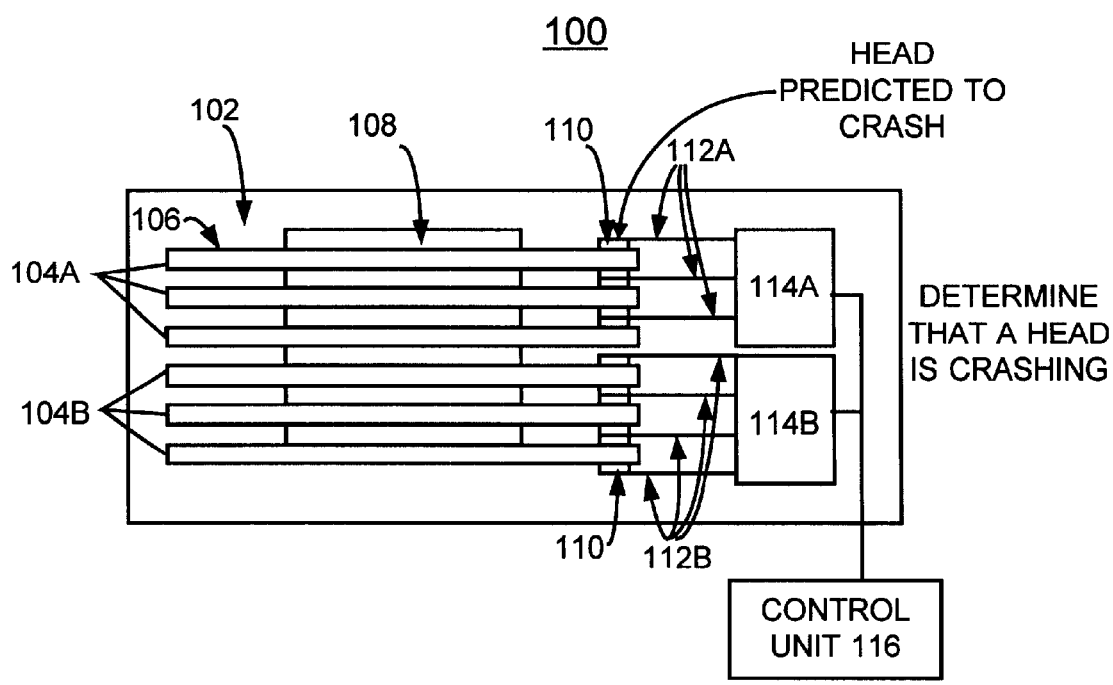
FIG. 1 is a schematic and block diagram representation illustrating a direct access storage device (DASD) for implementing methods for preemptive head crash avoidance in accordance with the preferred embodiment.

Having reference now to the drawings, in FIG. 1 there is illustrated a direct access data storage device (DASD) generally designated as 100 including a stack 102 of disks 104A and 104B each having at least one magnetic surface 106. The disks 104A and 104B are mounted parallel to one another for simultaneous rotation on and by an integrated spindle and motor assembly 108. Information on each magnetic disk surface 106 is read from or written to the disk surface 106 by a corresponding transducer head assembly 110 movable in a path having a radial component across the rotating disk surface 106.

Each transducer head assembly 110 is carried by an arm 112A, 112B. The arms 112A, 112B are ganged together for simultaneous pivotal movement by a respective voice coil motor (VCM) magnet assembly or actuator 114A, 114B. Drive signals applied to the VCM magnet assembly 114A, 114B cause the corresponding arms 112A, 112B to move in unison to position the transducer head assemblies 110 in registration with information storage tracks on the disk surfaces 106 where information is written or read. A control unit 116 that generates signals controlling the operation of various components of the DASD.

In accordance with features of the preferred embodiment, monitoring is performed to determine if a head is about to crash. When a head crash is predicted, data residing on the disk surfaces 106 serviced by the same actuator comb 114A or 114B containing the pre-crashed head 110 is backed up as required on the remaining disks in the DASD 100. The pre-crashed head 110 and other heads 110 serviced by the same actuator comb 114A or 114B are unloaded. By unloading the offending head 110, the DASD 100 can return to normal operation at a reduced capacity. If the head 110 is already crashing the actuator 114A, 114B containing this head is unloaded and data backup may be avoided. After heads 110 are unloaded, the remaining actuator 114A or 114B can continue normal operations.

Figure 2:
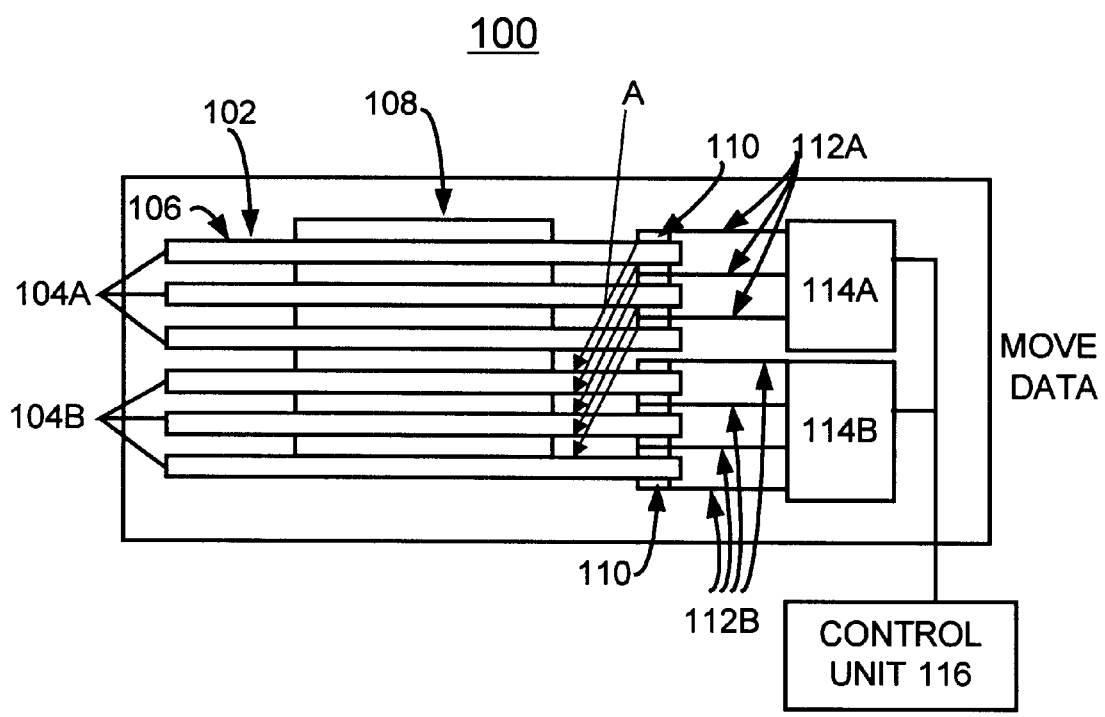
FIGS. 2 and 3 are diagrams similar to FIG. 1 illustrating exemplary sequential steps for preemptive head crash avoidance in accordance with the preferred embodiment.
Figure 3:
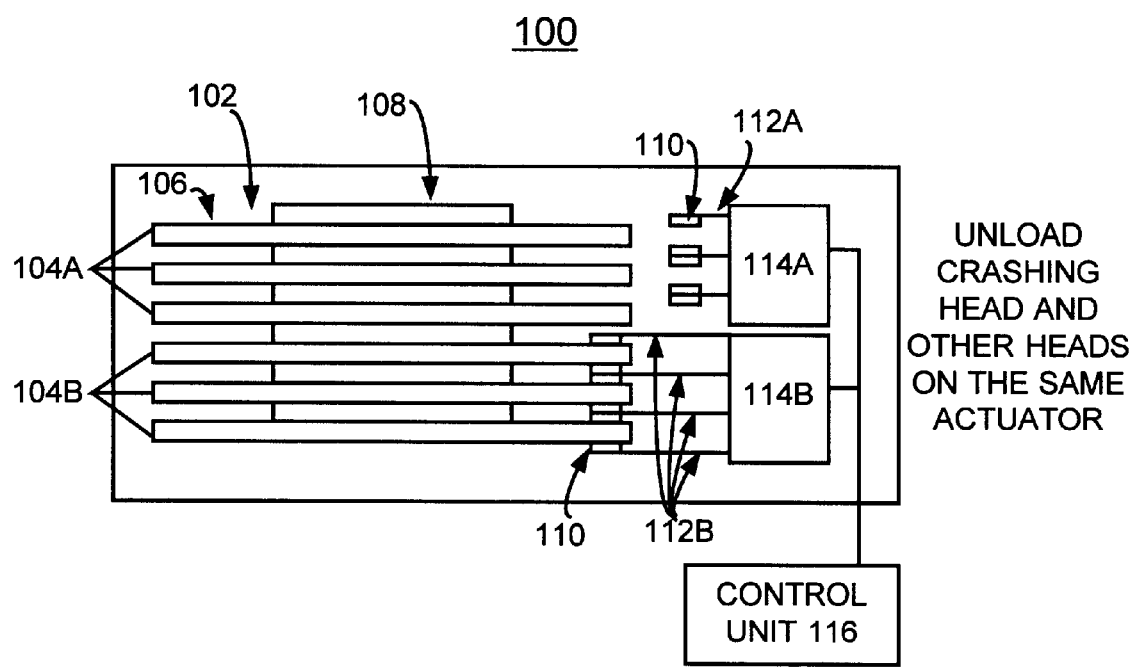
Figure 4:
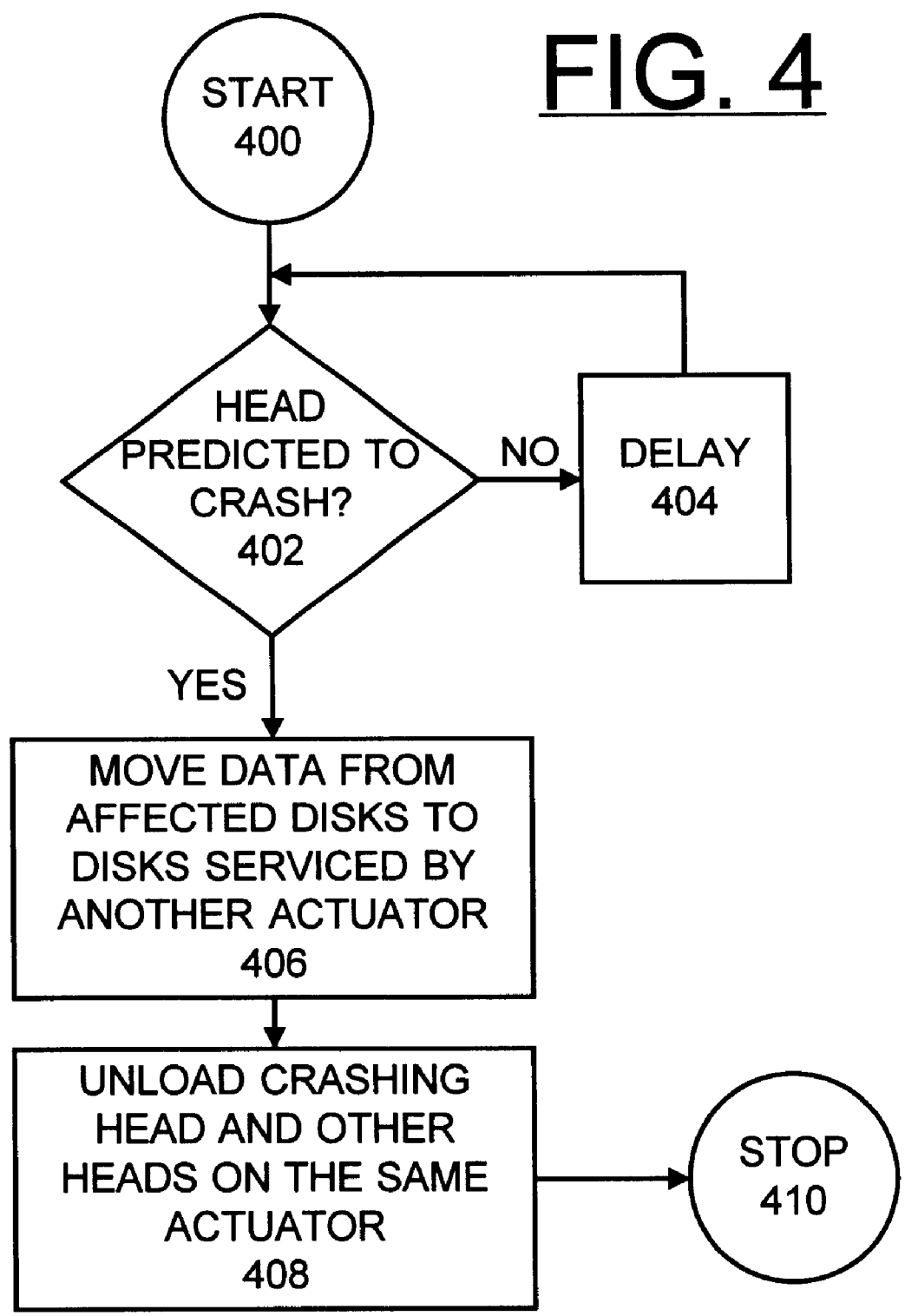
FIG. 4 is a flow chart illustrating sequential steps for preemptive head crash avoidance in accordance with the preferred embodiment.

Control unit 116 is suitably programmed to execute the logical flow functions of FIG. 4 of the preferred embodiment and as illustrated in FIGS. 1, 2, and 3.

As shown in FIG. 1, DASD 100 includes at least two actuators or a split actuator 114A, 114B. One of the heads 110 moved by actuator 114A is predicted to crash.

Referring to FIG. 2, as indicated by multiple arrows labeled A, data is moved from the disk surfaces 106 serviced by the actuator 114A to the remaining disk surfaces 106 serviced by the actuator 114B.

Referring to FIG. 3, the crashing head 110 and other heads 110 on the same actuator 114A are unloaded. After heads 110 serviced by actuator 114A are unloaded, the remaining actuator 114B can continue normal operations.

Referring to FIG. 4, there is shown a flow chart illustrating exemplary sequential steps for preemptive head crash avoidance in accordance with the preferred embodiment. The sequential operations start as indicated in a block 400. Monitoring for a predicted head crash is performed as indicated in a decision block 402. Methods such as flying height or error/reassign rate monitoring are used to make this assessment at decision block 402. When a predicted head crash is not identified, then after a set delay as indicated in a block 404, monitoring for a predicted head crash is continued at decision block 402. When determined that a head crash is predicted at decision block 402, then data from the affected disks are moved to disks serviced by another actuator as indicated in a block 406. A file allocation table or other means of determining disk drive directory information is used to determine a hierarch so that the most important data is moved to the disk surfaces 106 addressed by the operating actuator 114A, 114B. For example, the most important data is the data that cannot be rebuilt from another source, such as a CD ROM, tape, or the Internet. While the data is being transferred at block 406, the functionality of the crashing head is periodically checked. If the pending crash has progressed, then the actuator 114A, 114B can unload the heads immediately and preempt the data backup process. After the data backup process is completed or preempted at block 406, then the crashing head and other heads 110 on the same actuator 114A or 114B are unloaded as indicated in a block 408. This completes the sequential operations as indicated in a block 410.

It should be understood that the data from the affected disks can be moved to a separate storage device, such as another disk drive.

Figure 5:
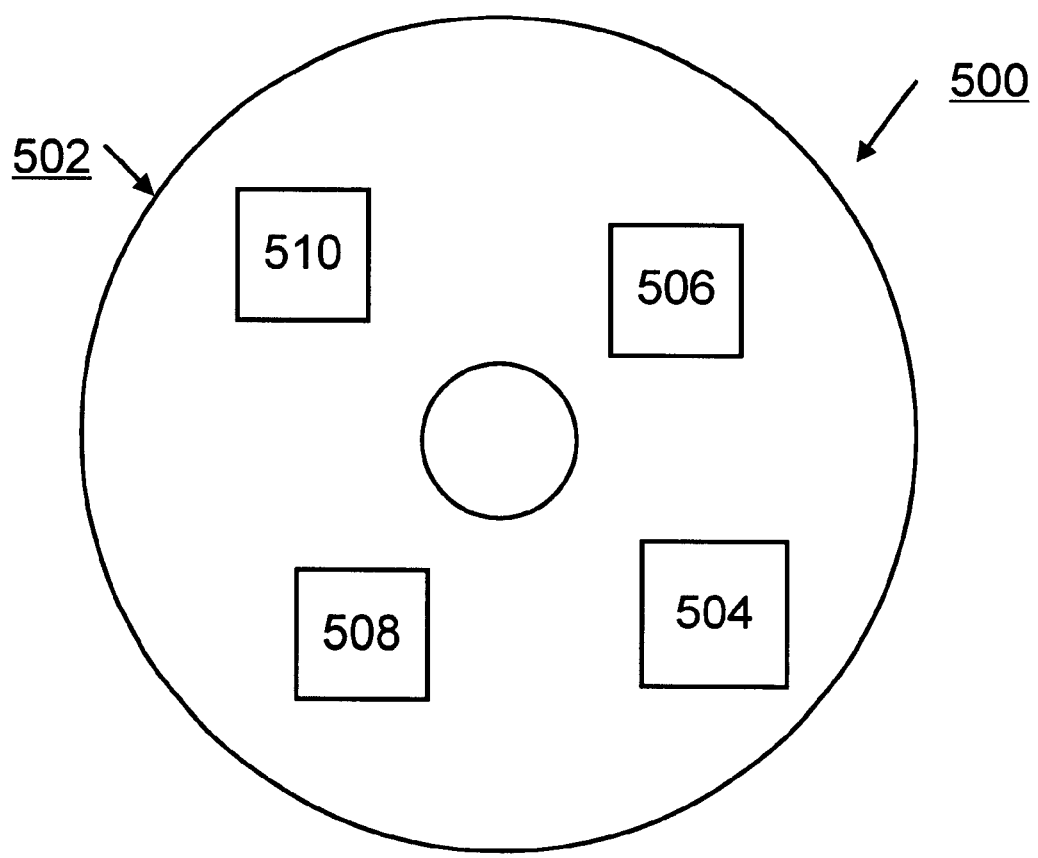
FIG. 5 is a block diagram illustrating a computer program product in accordance with the preferred embodiment.

Referring now to FIG. 5, an article of manufacture or a computer program product 500 of the invention is illustrated. The computer program product 500 includes a recording medium 502, such as, a floppy disk, a high capacity read only memory in the form of an optically read compact disk or CD-ROM, a tape, a transmission type media such as a digital or analog communications link, or a similar computer program product. Recording medium 502 stores program means 504, 506, 508, 510 on the medium 502 for carrying out the methods for preemptive head crash avoidance of the preferred embodiment in the DASD 100 of FIG. 1.

A sequence of program instructions or a logical assembly of one or more interrelated modules defined by the recorded program means 504, 506, 508, 510, direct the DASD 100 for implementing preemptive head crash avoidance of the preferred embodiment.

While the present invention has been described with reference to the details of the embodiments of the invention shown in the drawing, these details are not intended to limit the scope of the invention as claimed in the appended claims.

What is claimed is:

1. A method for preemptive head crash avoidance in a direct access storage device (DASD) comprising the steps of:

utilizing at least two actuators, each said actuator servicing at least one transducer head;

monitoring for a predicted head crash; and responsive to an identified predicted head crash, unloading a transducer head for said predicted head crash and unloading each additional transducer head being serviced by an actuator for said transducer head for said predicted head crash.

2. A method for preemptive head crash avoidance in a direct access storage device (DASD) as recited in claim 1 further includes the steps of responsive to an identified predicted head crash, transferring data from a disk surface associated with said transducer head for said predicted head crash and transferring data from a disk surface associated with each additional transducer head being serviced by said actuator for said transducer head for said predicted head crash.

3. A method for preemptive head crash avoidance in a direct access storage device (DASD) as recited in claim 2 wherein the steps of transferring data includes the step of transferring data to a disk surface addressed by a different one of said at least two actuators than said actuator for said transducer head for said predicted head crash.

4. A method for preemptive head crash avoidance in a direct access storage device (DASD) as recited in claim 2 includes the steps of checking a functionality of said transducer head for said predicted head crash and stopping data transfer responsive to an identified predefined functionality of said transducer head for said predicted head crash.

5. A method for preemptive head crash avoidance in a direct access storage device (DASD) as recited in claim 2 wherein the steps of responsive to an identified predicted head crash, transferring data from a disk surface associated with said transducer head for said predicted head crash and transferring data from a disk surface associated with each additional transducer head being serviced by said actuator for said transducer head for said predicted head crash includes the step of identifying a data hierarchy for transferring said data.

6. A method for preemptive head crash avoidance in a direct access storage device (DASD) as recited in claim 7 further includes the steps of utilizing a different one of said at least two actuators than said actuator for said transducer head for said predicted head crash and continuing operation of the direct access storage device (DASD).

7. A computer program product for preemptive head crash avoidance in a direct access storage device (DASD), said computer program product including a plurality of computer executable instructions stored on a computer readable medium, wherein said instructions, when executed by said DASD, cause the DASD to perform the steps of:

monitoring for a predicted head crash; responsive to an identified predicted head crash, transferring data from a disk surface associated with a transducer head for said predicted head crash and transferring data from each disk surface associated with each additional transducer head being serviced by said actuator for said transducer head for said predicted head crash; and responsive to an identified predicted head crash, unloading a transducer head for said predicted head crash and unloading each additional transducer head being serviced by an actuator for said transducer head for said predicted head crash.

8. A computer program product for preemptive head crash avoidance in a direct access storage device (DASD) as recited in claim 7 where in the steps of transferring data includes the step of transferring data to a disk surface addressed by a different actuator than said actuator for said transducer head for said predicted head crash.

9. A computer program product for preemptive head crash avoidance in a direct access storage device (DASD) as recited in claim 7 wherein the steps of transferring data includes the step of identifying a data hierarchy for transferring said data.

10. A computer program product for preemptive head crash avoidance in a direct access storage device (DASD) as recited in claim 7 further includes the steps of utilizing a different actuator than said actuator for said transducer head for said predicted head crash and continuing operation of the direct access storage device (DASD).

11. Apparatus for preemptive head crash avoidance in a direct access storage device (DASD) comprising:

at least two actuators, each said actuator respectively servicing at least one transducer head;

a control unit, said control unit for monitoring for a predicted head crash;

said control unit, responsive to an identified predicted head crash, for transferring data from a disk surface associated with a transducer head for said predicted head crash and for transferring data from each disk surface associated with each additional transducer head being serviced by said actuator for said transducer head for said predicted head crash; and said control unit, responsive to an identified predicted head crash, for unloading a transducer head for said predicted head crash and for unloading each additional transducer head being serviced by an actuator for said transducer head for said predicted head crash.

12. Apparatus for preemptive head crash avoidance in a direct access storage device (DASD) as recited in claim 11 wherein said control unit, responsive to unloading said transducer heads, for utilizing a different actuator than said actuator for said transducer head for said predicted head crash and continuing operation of the direct access storage device (DASD).

13. Apparatus for preemptive head crash avoidance in a direct access storage device (DASD) as recited in claim 11 wherein said control unit, for identifying a data hierarchy for transferring said data and for transferring data to a disk surface addressed by a different actuator than said actuator for said transducer head for said predicted head crash.

* * * * *

UNITED STATES PATENT AND TRADEMARK OFFICE
CERTIFICATE OF CORRECTION

PATENT NO. : 6,344,938 B1
DATED : February 5, 2002
INVENTOR(S) : Gordon James Smith It is certified that error appears in the above-identified patent and that said Letters Patent is hereby corrected as shown below:

Column 4,
Line 60, replace "7" with -- 1 --.

Column 5,
Line 18, replace "where in" with -- wherein --.

Signed and Sealed this

Fourteenth Day of May, 2002

Attest:

JAMES E. ROGAN
Attesting Officer     Director of the United States Patent and Trademark Office